United States Patent [19]

Ataka et al.

[11] 4,195,230

[45] Mar. 25, 1980

[54] INPUT SCREEN

[75] Inventors: Saburo Ataka, Tokyo; Kiyohisa Inao, Hachioji; Kanetosi Tada, Nagano; Yoshinori Okamura; Isamu Kimura, both of Yamanashi, all of Japan

[73] Assignees: Hitachi, Ltd.; Hitachi Denshi Kabushiki Kaisha, both of Japan

[21] Appl. No.: 891,033

[22] Filed: Mar. 28, 1978

[30] Foreign Application Priority Data

Apr. 1, 1977 [JP] Japan .................................. 52-36126

[51] Int. Cl.[2] .............................................. G01J 1/58

[52] U.S. Cl. .................................... 250/483; 250/486

[58] Field of Search ................ 250/483, 486, 213 VT; 427/157, 158

[56] References Cited

U.S. PATENT DOCUMENTS

| | | | |
|---|---|---|---|
| 2,525,832 | 10/1950 | Sheldon | 178/7.2 |
| 3,944,835 | 3/1976 | Vosburgh | 250/486 |
| 4,011,454 | 3/1977 | Lubowski et al. | 250/486 |

*Primary Examiner*—Bruce C. Anderson

*Attorney, Agent, or Firm*—Craig and Antonelli

[57] ABSTRACT

An input screen of an X-ray fluoromultiplier tube, that is, an X-ray image intensifier tube, wherein an evaporated aluminum film is interposed between a substrate and a fluorescent substance (cesium iodide) film is disclosed.

The input screen according to this invention does not undergo the "charge-up" attributed to the exfoliation or cracks of the cesium iodide film, and can therefore present a picture of extraordinarily high quality.

11 Claims, 3 Drawing Figures

INPUT SCREEN

LIST OF PRIOR ART (37 CFR 1. 56 (a))

The following references are cited to show the state of the art.

(1) J. Boleslav et al., TELSA electronics, vol. 1, No. 3, pp. 3-12 (1973):

Although an X-ray image intensifier tube in which cesium iodide employing Na as an activator is applied to a fluorescent film is disclosed, the material of a substrate is not specified, and the use of an evaporated aluminum film is not referred to.

(2) H. Minami et al., Toshiba Review, vol. 102, No. 102, pp. 24-28 (1976):

Substantially the same as in the report (1). No disclosure is made of an evaporated aluminum film.

(3) A. L. N. Stevels et al., Philips Res. Repts., vol. 29, pp. 340-352 (1974):

A process for manufacturing a cesium iodide film employing sodium as an activator is disclosed. It is stated that silica or aluminum is used for a substrate, but the deposition of an evaporated aluminum film on the substrate is not referred to.

(4) A. L. N. Stevels et al., Philips Res. Repts., vol. 29, pp. 353-362 (1974):

Scattering of light by cesium iodide employing sodium as an activator, and logical support thereof. No reference is made to an evaporated aluminum film.

BACKGROUND OF THE INVENTION

Field of the Invention

This invention relates to an input screen of an X-ray fluoromultiplier tube, that is, an X-ray image intensifier tube. More particularly, it relates to an input screen of an X-ray image intensifier tube in which the smoothness of a surface is excellent, which is not feared to undergo the exfoliation or cracks of a film and which brings forth a high sensitivity and resolution.

DESCRIPTION OF THE PRIOR ART

FIG. 1 shows the schematic structure of an X-ray image intensifier tube. The X-ray image intensifier tube of this type is described in detail in, for example, J. Boleslav et al., TESLA electronics, vol 1, No. 3, pp. 3-12 (1973). Here, the construction will be briefly explained.

An X-ray beam 10 having entered an input screen 12 permeates through a substrate 16, and impinges on a fluorescent film 17. That part of the fluorescent film 17 which has been irradiated by the X-rays fluoresces. Since a photocathode (photoelectric film) 18 is deposited on the fluorescent film 17, photoelectrons are created in the photocathode 18 overlying that part of the fluorescent film 17 which has fluoresced by the X-ray irradiation. The photoelectrons generated in the photocathode 18 are focused by a focusing electrode 15 and an anode 13, and form an image on an output screen 14. Since the output screen 14 comprises a film of a fluorescent substance such as ZnS, it is excited by the photoelectrons and fluoresces. Accordingly, the same image as an image having appeared on the input fluorescent screen 17 owing to the incident X-ray beam 10 is obtained on the output fluorescent screen 14. Thus, the image which is approximately 5,000 times as bright as the image on the fluorescent film 17 can be presented on the output screen 14.

As shown in FIG. 1, the input screen 12 of such an X-ray image intensifier tube has the structure in which the fluorescent film 17 and the photelectric film 18 are stacked on the substrate 16 made of a sheet of glass or aluminum.

The fluorescent film 17 contains a fluorescent substance whose parent substance is cesium iodide (CsI) and which is activated with an impurity such as Na, Li and Tl. As the thickness of the film, values of about 100-500 μm are usually employed.

The photoelectric film 18 is made of a conventional photoelectric substance such as Cs-Sb and Cs-Na-K-Sb. The thickness of the film is about 50-1,000 A.

In order to prevent a reaction which is feared to take place between the fluorescent film 17 and the photoelectric film 18, an insulating film made of any of various oxides including $SiO_2$, SiO, $Al_2O_3$, $In_2O_3$, $SnO_2$, $B_2O_3$ etc. may be interposed therebetween. In this way, the two films 17 and 18 are perfectly isolated by the insulating film, and hence, the reaction is not feared to occur therebetween.

Cesium iodide has a high X-ray absorptivity. Therefore, when this substance is used as the fluorescent film of the X-ray image intensifier tube, it can be expected to attain a very high sensitivity. Moreover, with cesium iodide, an evaporated film can be easily formed. Therefore, a fluorescent film whose surface is very smooth and which has a high packing density can be obtained. Owing to such merits, cesium iodide is most extensively used for the fluorescent film of the X-ray image intensifier tube.

Cesium iodide, however, is highly hygroscopic and is conspicuously deteriorated in the air. Another problem is that, since the substance exhibits a large coefficient of linear expansion, the fluorescent film is prone to undergo cracks which are attributed to the difference from the coefficient of linear expansion of the substrate.

The CsI film can be easily recovered from the deterioration in the air by heat-treating it in a vacuum or an inert gas. However, when such a heat treatment is carried out, the generation of the cracks is further promoted, and even the exfoliation of the fluorescent film from the substrate takes place in an extreme case. A highly sensitive input screen free from the fear of the generation of such cracks has therefore been eagerly requested.

SUMMARY OF THE INVENTION

An object of this invention is to solve the problems of the prior-art input screen for the x-ray image intensifier tube and to provide an input screen which has a high resolution as well as a high sensitivity, whose surface is very smooth and which is not feared to undergo cracks.

In order to accomplish the object, this invention interposes an evaporated aluminum film between a substrate and a fluorescent screen.

DETAILED DESCRIPTION

As described above, cesium iodide is a material which is highly hygroscopic and which has a large coefficient of linear expansion, and it is therefore deteriorated drastically when placed in the air. It is possible to recover the deterioration by a heat treatment in a vacuum or an inert gas. However, when such an activating treatment is performed, cracks appear conspicuously in the surface of a CsI film and even the exfoliation of the CsI film occurs in an extreme case on account of the difference between the coefficients of expansion of cesium iodide and a substrate.

Figure 1:
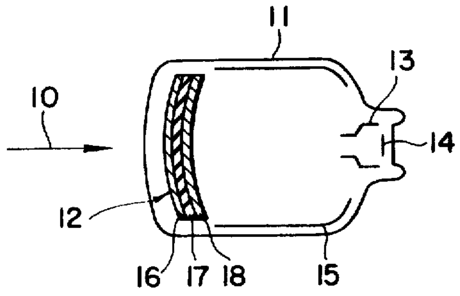
FIG. 1 is a model view for explaining the structure of an X-ray image intensifier tube.

In the X-ray image intensifier tube, in order to convert visible light generated in a fluorescent film into photoelectrons, the photoelectric film 18 serving as a photocathode is deposited on the fluorescent film 17 as illustrated in FIG. 1. To the end of enhancing the photoelectric efficiency, the photoelectric film 18 is made very thin, and it is only about 500 A thick at the most. Therefore, the cracks of the fluorescent film or an uneven surface thereof have /has a great influence on the photoelectric film, to drastically degrade the photoelectric characteristic and to incur the degradation of the picture quality.

More specifically, when the cracks exist in the fluorescent film the photoelectric film deposited on the fluorescent film is not uniform over the entire area, but it becomes fragmented at the parts of the cracks. When the photoelectric film becomes fragmented in this manner, positive holes are accumulated in the surface of the photoelectric film, and the "charge-up" arises. As a result, the uniformity of a picture lowers conspicuously.

The unevenness of the surface of the fluorescent film is also a cause for the appearance of cracks in the photoelectric film. As in the case of the cracks described above, the uneven surface results in incurring the nonuniformity of a picture.

It has been proposed that the surface of the substrate is roughened so as to increase the bonding property of the substrate with the fluorescent film. However, when cesium iodide is evaporated onto such a rough surface, the surface of the evaporated cesium iodide film becomes uneven. Likewise to the above case, therefore, the photoelectric film becomes fragmented to give rise to the nonuniformity of a picture.

This invention has solved all the foregoing problems in such a way that an input screen is constructed by interposing an evaporated aluminum film between a substrate and a fluorescent film (cesium iodide film).

The input screen with the evaporated aluminum film interposed between the substrate and the fluorescent film as described above is not feared to undergo the cracks, the film exfoliation and the "charge-up" which are attributed to the unevenness of the substrate and the difference between the coefficients of linear expansion of the substrate and the fluorescent film. Accordingly, an X-ray image intensifier tube fabricated by assembling such an input screen thereinto does not undergo the degradation of the uniformity of a picture at all and exhibits an extraordinarily high resolution and sensitivity.

Figure 2:
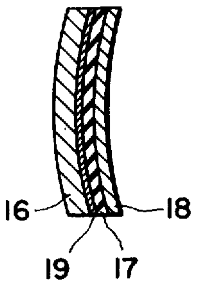
FIG. 2 is a sectional view showing the structure of an input screen according to this invention.

The structure of the input screen according to this invention is illustrated in FIG. 2.

As apparent from this figure, an input screen 12 according to this invention is so constructed that an evaporated aluminum film 19, a fluorescent film (input screen) 17 and a photoelectric film 18 are successively stacked on a substrate 16.

The substrate 16 is made of a sheet or thin plate of, for example, aluminum, and aluminum alloy or glass. The thickness of the substrate is determined depending on the mechanical strength, the ease of fabrication, the transmission factor for X-rays, etc. A preferable thickness is approximately 150–300 μm in the case of aluminum or the alloy thereof, and approximately 300 μm - 3 mm in the case of glass.

The evaporated aluminum film 19 can be formed by any of various processes for evaporation such as vacuum evaporation, electron-beam evaporation and sputter evaporation. Although the lower limit of the thickness of the evaporated aluminum film usable in this invention is, of course, somewhat different depending on the surface condition of the substrate, even an evaporated aluminum film which is as thin as about 5 Å can be used in this invention if the surface of the substrate is smooth as in aluminum polished into a mirror finished surface. Aluminum transmits X-rays well. From only the standpoint of the quantity of transmission of X-rays, therefore, it is possible to use an evaporated aluminum film which is as thick as, e.g., about 1 mm. Such a thick film, however, is not preferable in practical use inasmuch as an extremely long time is required in order to form it by evaporation. The maximum value of the thickness of the film which can be formed by evaporation in practical use is approximately 100 μm, and the range of film thicknesses which brings forth a favorable result in this invention is approximately 1,000–6,000 Å.

The thickness of the fluorescent film 17 needs to be approximately 100–500 μm. When the fluorescent film is thinner than 100 μm, the quantity of a fluorescent substance existing per unit area is insufficient, and hence, the luminous intensity lacks. When it is thicker than 500 μm, the quantity by which produced visible light is absorbed by the fluorescent substance increases, and the quantity of light arriving at the photoelectric film 18 rather decreases.

The photoelectric film 18 needs to be as thin as possible in order to enhance the sensitivity. In this invention, the film which is approximately 50–1,000 Å thick can be used. An evaporated film of a photoelectric substance such as Cs-Sb and Cs-Na-K-Sb is employed as the photoelectric film.

The cesium iodide film can be made only of cesium iodide as described before. Alternatively, it can be made of cesium iodide which is doped as an activator with one or more elements selected from the group consisting of alkaline metals such as Na and Li; alkaline-earth metals such as Ca, Ba and Mg; Tl; etc. In order to prevent any reaction between the cesium iodide film and the photoelectric film, it is advisable to interpose as a protective film a film made of any of various oxides such as $SiO_2$, SiO, $Al_2O_3$, $In_2O_3$, $SnO_2$, $B_2O_3$, $Nb_2O_3$ and $CeO_2$, an $MgF_2$ film, or the like.

On the surface of the sheet of aluminum, there are flaws caused by rolling, films of oxides attributed to oxidation during the rolling process, etc. For this reason, when such a sheet of aluminum is used for the substrate and the cesium iodide film is directly deposited thereon, the bonding property between the cesium iodide film and the substrate is extremely inferior, and cracks are prone to appear in the cesium iodide film on account of the difference between their coefficients of thermal expansion.

According to this invention, however, the cesium iodide film is not deposited directly on the substrate, but the evaporated aluminum film intervenes between the substrate and the cesium iodide film. Thus, when the cesium iodide film is deposited immediately after forming the aluminum film by evaporation, evil influences by the flaws and oxides of the substrate are completely eliminated. As a result, the bonding force between the cesium iodide film and the substrate becomes very intense, and the appearance of cracks is not noted at all.

The reasons why the evaporated aluminum film has been chosen as the film to intervene between the substrate and the cesium iodide film are as follows:

(1) The evaporated aluminum film exhibits a very good bonding property with various substrates of, not only aluminum, but also glass, ceramics, beryllium etc.

(2) Since the evaporated aluminum film has a very high endurance against a heat treatment such as quick heating and quick cooling, it is not feared to undergo cracks.

(3) Since the grains of aluminum in the evaporated aluminum film are very fine, an evaporated film the surface of which is extraordinarily smooth is obtained.

(4) The X-ray absorption coefficient of aluminum is small, and hence, even when the evaporated aluminum film is deposited on the substrate, the sensitivity to X-rays scarcely changes.

EXAMPLE:

In a bell jar of vacuum apparatus, a boat for evaporating cesium iodide (made of tantalum and having dimensions of 35 mm$\times\pm$mm$\times$18 mm) was placed, the boat containing about 50 gr. of cesium iodide and about 50 mg. of sodium iodide therein. Aluminum was put into a boat for evaporating aluminum (made of tantalum or tungsten), and the boat was similarly placed in the bell jar.

An aluminum substrate washed well in advance was situated at a predetermined position within the bell jar, and the bell jar was evacuated into $1\times10^{-6}$ Torr.

The aluminum substrate was heated to 400° C., and was held at the temperature for about 10 minutes. 10 minutes later, the heating was ceased, and the aluminum substrate had its temperature lowered in the vacuum into 0°-100° C.

Subsequently, the aluminum depositing boat was heated so as to deposit an evaporated aluminum film approximately 1,000 Å thick on the substrate. The deposition of the evaporated aluminum film on the aluminum substrate may well be previously performed by the use of another device for evaporation. However, the use of the same evaporation device as for the deposition of the cesium iodide film as in the present example is very favorable in that immediately after the deposition of the evaporated aluminum film, the cesium iodide film can be deposited without touching the open air.

After elevating the temperature of the substrate again, a current of 130–170 A was caused to flow through the cesium iodide evaporating boat. Thus, all the cesium iodide and sodium iodide in the boat was vaporized to deposit onto the evaporated aluminum film a cesium iodide film containing sodium (200 μm thick).

The current for heating the boat was cut off, and the substrate with the aluminum film and the cesium iodide film deposited thereon was taken out of the bell jar when its temperature had lowered down to the room temperature.

After subjecting the resultant substrate to a heat treatment at 400° C. for 2 hours in a vacuum, a photoelectric film of, e.g., cesium-antimony was deposited thereon by the conventional process. Then, an input screen was formed. The input screen was arranged at a predetermined position in a predetermined glass envelope 11 as shown in FIG. 1, together with a focusing electrode, an anode and an output fluorescent screen (employing ZnS as a fluorescent substance), and the glass envelope was evacuated. Then, an X-ray image intensifier tube was obtained. In case of depositing a protective film for preventing the reaction between the cesium iodide film and the photoelectric screen, a film of any of the substances previously mentioned such as $Al_2O_3$ may be deposited to a thickness of 1,000 Å - 1 μm by sputtering, electron-beam evaporation or the like after carrying out the aforecited heat treatment for activation.

Figure 3:
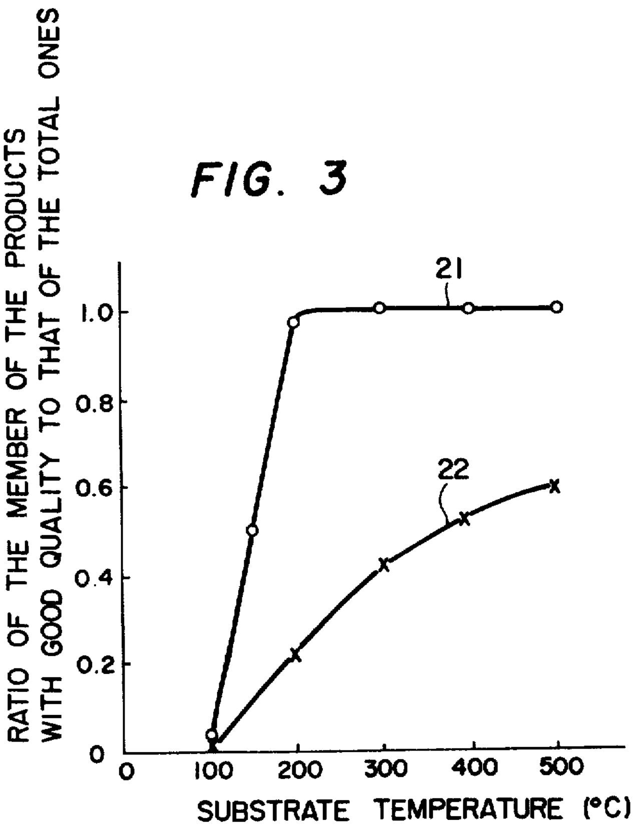
FIG. 3 is a graph showing the relationship between the substrate temperature in the case of depositing an evaporated cesium iodide film and the rate of conforming articles.

The X-ray image intensifier tubes respectively equipped with the input screen according to this invention and the prior-art input screen were fabricated, and the rates of conforming articles (the number of conforming articles : the total number of articles) of both the tubes were compared. FIG. 3 is a graph which shows the relationship between the substrate temperature in the case of depositing the cesium iodide film and the rate of conforming articles. Curves 21 and 22 represent results in the cases of employing the input screen of this invention and the prior-art input screen, respectively. Here, the expression "conforming article" which may be altered to "product with good quality" refers to an article or product in which the "charge-up" ascribable to the exfoliation or cracks of the cesium iodide film in the input screen was not noted.

As seen from FIG. 3, in the case of the input screen according to this invention, the rate of conforming articles rises as the substrate temperature at the deposition of the evaporated cesium iodide film becomes higher, and if the deposition of the cesium iodide film is carried out with the substrate temperature held at approximately 200° C. or above, no non-conforming article or product will be produced.

On the other hand, in the case of the prior-art input screen, the rate of conforming articles is enhanced in a way as the substrate temperature at the deposition of the cesium iodide film is made higher. However, even if the deposition of the evaporated cesium iodide film is executed at, for example, a substrate temperature of 400° C., the rate of conforming articles will be only about 50%, which is much lower than the rate of conforming articles in this invention.

When the substrate temperature at the deposition of the evaporated cesium iodide film is higher than 500° C., the vapor pressure of cesium iodide is conspicuously high, and the formation of the evaporated cesium iodide film is difficult. It is therefore advisable to deposit the cesium iodide film while holding the temperature of the substrate at 200°-500° C.

What is claimed is:

1. An input screen of an X-ray image intensifier tube comprising a substrate of aluminum or aluminum alloy; an evaporated aluminum film deposited on a major surface of said substrate, the surface of said evaporated aluminum film not adjacent said substrate being smooth; a continuous, smooth cesium iodide film deposited on said evaporated aluminum film, said evaporated aluminum film acting to substantially prevent unevenness, cracking and exfoliation of said cesium iodide film and to create a strong bond between the substrate and the cesium iodide film; and a photoelectric film deposited on said cesium iodide film, whereby degradation of a picture produced by said input screen due to cracks in or exfoliation of said cesium iodide film or an uneven surface of said cesium iodide film is substantially prevented.

2. An input screen of an X-ray image intensifier tube according to claim 1, wherein said evaporated aluminum film has a thickness of 5 A to 100 μm.

3. An input screen of an X-ray image intensifier tube according to claim 1, wherein said photoelectric film is made of a substance selected from the group consisting of cesium-antimony and cesium-sodium-potassium-antimony.

4. An input screen of an X-ray image intensifier tube according to claim 1, wherein said photoelectric film has a thickness of 50 to 1,000 A.

5. An input screen of an X-ray image intensifier tube according to claim 1, wherein said substrate is made of a material selected from the group consisting of a plate of aluminum 150 to 300 μm thick and a plate of an aluminum alloy 150 to 300 μm thick.

6. An input screen of an X-ray image intensifier tube according to claim 1, wherein said cesium iodide film has a thickness of 100 to 500 μm.

7. An input screen of an X-ray image intensifier tube according to claim 1, wherein the cesium iodide contains an activator.

8. An input screen of an X-ray image intensifier tube according to claim 7, wherein said activator is at least one element selected from the group consisting of Na, Li, Ca, Ba, Mg and Tl.

9. An input screen of an X-ray image intensifier tube according to claim 1, wherein said cesium iodide film is in close contact with said evaporated aluminum film.

10. An input screen of an X-ray image intensifier tube according to claim 1, wherein a protective film of a material selected from the group consisting of $SiO_2$, $SiO$, $Al_2O_3$, $In_2O_3$, $SnO_2$, $B_2O_3$, $Nb_2O_3$, $CeO_2$ and $MgF_2$ is interposed between said cesium iodide film and said photoelectric film, whereby reaction between said cesium iodide film and said photoelectric film is substantially prevented.

11. An input screen of an X-ray image intensifier tube according to claim 1, wherein the surface of said photoelectric film not adjacent said cesium iodide film is smooth.

* * * * *